March 16, 1948.     T. M. HAYNES     2,437,740
REPLACEABLE NOSE FOR SPOT WELDING TIPS
Filed Oct. 26, 1945
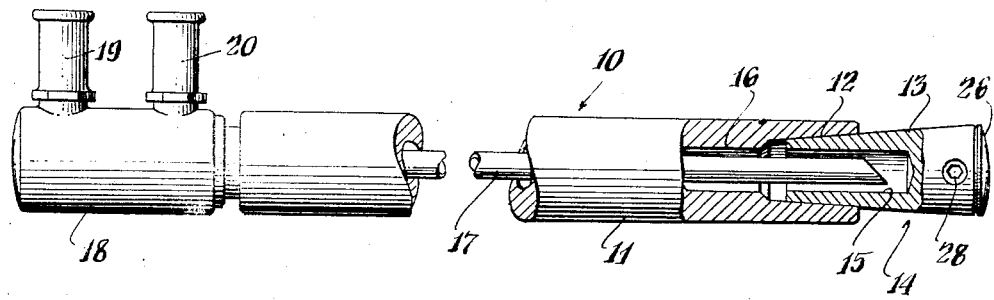
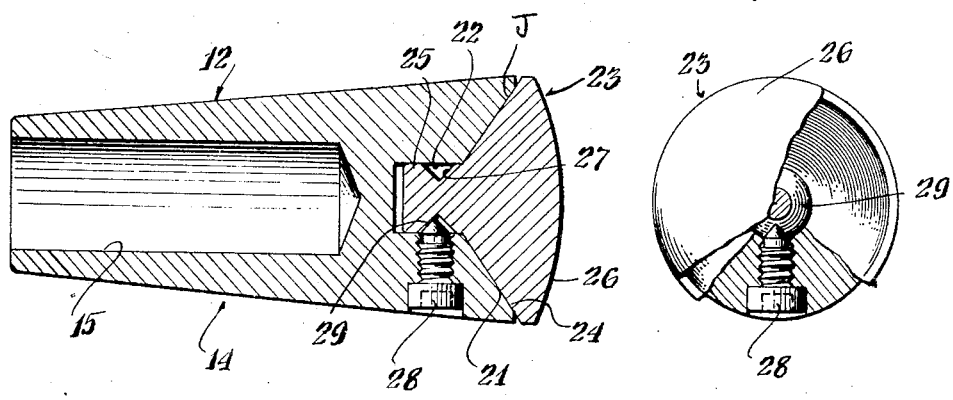
INVENTOR
*Thomas M. Haynes*
BY *Chester F. Carlson*
ATTORNEY Patented Mar. 16, 1948

2,437,740

UNITED STATES PATENT OFFICE 2,437,740

REPLACEABLE NOSE FOR SPOT WELDING TIPS

Thomas M. Haynes, Indianapolis, Ind., assignor to P. R. Mallory & Co., Inc., Indianapolis, Ind., a corporation of Delaware Application October 26, 1945, Serial No. 624,692

6 Claims. (Cl. 219—4)

This invention relates to resistance welding electrodes.

An object of the invention is to improve welding electrodes.

Other objects of the invention will be apparent from the following description and accompanying drawings taken in connection with the appended claims.

The invention comprises the features of construction, combination of elements, arrangement of parts and methods of manufacture and operation referred to above or which will be brought out and exemplified in the disclosure hereinafter set forth, including the illustrations in the drawings.

In the drawings:

Figure 1 is a side view, partially in section, of an electrode holder having a novel welding tip mounted thereon;

Figure 2 is a sectional view of a welding tip with a replaceable nose secured thereto; and Figure 3 is an end view of the welding tip with portions thereof broken away to show the detailed features of construction.

According to one aspect of this invention, a removable nose is provided for a welding tip which may be replaced without interfering with the cooling system or the adjustment of the welding electrodes.

While a preferred embodiment of the invention is described herein, it is contemplated that considerable variation may be made in the method of procedure and the construction of parts without departing from the spirit of the invention. In the following description and in the claims, parts will be identified by specific names for convenience, but they are intended to be as generic in their application to similar parts as the art will permit.

In accordance with the invention, the construction of a conventional welding tip is modified so that a removable nose may be secured thereto, this nose being relatively small and inexpensive in comparison with the welding tip. Accordingly, when the face of the nose has worn down, it may be replaced at a small fraction of the cost necessary to re-machine or replace the tip. The removable nose is preferably constructed in such fashion that the face thereof may be readily redressed by conventional techniques such, for example, as the use of a tip dresser or a cloth-covered paddle where the welding face is not worn sufficiently to necessitate replacement of the tip. The replaceable nose portions may be constructed with various conventional or unusual welding faces so that a variety of different welding operations may be performed with a single tip. The nose is preferably constructed so that it is adjacent the cooling system of the tip but does not form a part thereof with the result that removal or replacement of the nose does not interfere with the adjustment of the cooling system or other parts of the welding apparatus.

The features of this invention may be incorporated in offset internally fluid cooled electrodes where the fluid must circulate near the welding face of the tip. The cost of such tips is relatively high due to the operations required to get a water chamber throughout most of the length of the tip. Therefore, the replaceable nose is of considerable value in permitting longer use of the body of the tip despite destruction of the welding face.

Referring now to the drawings in detail, a tip holder generally indicated at 10 comprises a tubular body 11 adapted to be clamped to an arm of a resistance welding machine and having a tapered end socket 12 to receive the shank 13 of a welding tip 14. A cooling fluid cavity 15 is formed in the shank 13 and this cavity communicates with the interior passage 16 of the tip holder. A conduit 17 extends through the passage 16 into the cooling fluid cavity 15, said conduit being mounted on a fluid connection member 18 which is supported by the holder 10. The connection 18 is provided with inlet and outlet pipes 19, 20 which communicates, respectively, with the conduit 17 and the passage 16. Accordingly, it will be apparent that a continuous stream of cooling fluid may be passed through the inlet 19, conduit 17, cooling fluid cavity 15, passage 16 and outlet 20 to thereby cool the tip 14 as the welding operation proceeds.

The head of the tip 12 is shaped to form a conically tapered recess 21 which merges into a central cylindrical bore 22. The replaceable nose 23 comprises a tapered surface 24, which is complementary with the recess 21, together with a projection 25 which is adapted to fit closely into the central cylindrical bore 22. The removable nose has a welding face 26 which may be of any desired shape and which is adapted to engage the work to be welded.

A circumferential groove 27 formed on the projection 25 is engaged by a set screw 28 mounted in a suitable threaded passage in the welding tip. The screw 28 is adapted to bear against the inner surface 29 of the groove with the result that the nose 23 is forced inwardly as the set screw is tightened so that the complementary surfaces 21, 24 are forced into intimate contact at the joint J to provide thermal and electrical conductivity. Since the nose 23 forms no part of the water cooling system, removal or replacement of the nose does not interfere with the operation of the cooling system. In operation, welding current passes from the holder 10 through the shank 14, the joint J, and the nose 23 to the object to be welded. However, due to the intimate contact between the nose and the welding tip at the joint, a very little or negligible resistance loss is introduced so that the replaceable nose functions in an efficient manner. The electrical and thermal conductivity between the body of the tip and the replaceable nose may be increased by silver plating both parts.

While the present invention, as to its objects and advantages, has been described herein as carried out in a specific embodiment thereof, it is not desired to be limited thereby but it is intended to cover the invention broadly within the spirit and scope of the appended claims.

What is claimed as new and desired to be secured by Letters Patent is:

1. A welding tip having a body adapted to fit into a tip holder, the shank of said tip having a cavity formed therein for circulation of cooling fluid; a removable nose for said tip comprising a welding face and a surface complementary with the head of said tip; and a clamping member mounted on said tip to force said complementary surface into intimate contact with the head of the tip whereby a joint having high thermal and electrical conductivity is obtained, said joint being located between the welding face and the end of the cooling fluid cavity in the welding tip shank.

2. A welding tip having a body adapted to fit into a tip holder, the shank of said tip having a cooling fluid cavity formed therein, the head of said tip being shaped to form a central cylindrical bore; a removable nose comprising a face for contacting an object to be welded, a surface which is complementary to the head of said tip, and a projection adapted to extend into said bore; and means for forcing said projection toward the inner end of said bore thereby to force said complementary surface into intimate contact with the head of the tip whereby a joint having high thermal and electrical conductivity is obtained, said joint being located between the welding face and the end of the cooling fluid cavity in the welding tip shank.

3. A welding tip having a body adapted to fit into a tip holder, the head of said tip being recessed to form a peripheral tapered surface and a central cylindrical bore; a removable nose for said tip comprising a welding face, a tapered surface complementary with the peripheral surfaces of the tip, and a projection adapted to extend into said bore; and means for clamping the detachable nose to the welding tip to force said complementary surfaces into intimate contact whereby a joint having high electrical conductivity is obtained.

4. A welding tip having a body adapted to fit into a tip holder, a cavity formed in the shank of said tip for circulation of cooling fluid, the head of said tip being recessed to form a peripheral conical surface and a central cylindrical bore; a removable nose for said tip comprising shoulders which are complementary to said conical surface, and a projection adapted to extend into said bore, said projection having a circumferential groove formed therein; and a set screw mounted in said tip, the end of said set screw bearing against the inner side of said groove to force the nose into intimate contact with the tip whereby a joint having high thermal and electrical conductivity is obtained.

5. A welding tip having a body adapted to fit into a tip holder, a cavity formed in the shank of said tip for circulation of cooling fluid, said tip having a recessed portion at the outer end thereof and a central cylindrical bore; a removable nose comprising a welding face, shoulders which are complementary to the recessed portion of said tip, and a projection adapted to extend into said bore, said projection having a circumferential groove formed therein; and a clamping member mounted in said tip, the end of said member bearing against the inner side of said groove to force the nose into intimate contact with the tip whereby a joint having high thermal and electrical conductivity is obtained, said joint being located between the welding face and the end of the cooling fluid cavity in the welding tip shank.

6. A welding tip having a body adapted to fit into a tip holder, a nose which is adapted to fit on the outer end of said tip, said nose having a welding face for engaging an object to be welded, complementary surfaces on the outer end of said tip and the inner end of said nose, and clamping means for forcing said complementary surfaces into engagement with each other including a set screw mounted on said tip and engageable with an inclined surface of said nose, the longitudinally directed force exerted by said set screw being effective in a direction substantially perpendicular to said set screw to clamp said complementary surfaces together and maintain them in their clamped position.

THOMAS M. HAYNES.

REFERENCES CITED

The following references are of record in the file of this patent:

UNITED STATES PATENTS

| Number | Name | Date |
| --- | --- | --- |
| 1,046,639 | Pierce | Dec. 10, 1912 |
| 1,304,227 | Weed | May 20, 1919 |
| 1,330,563 | Weed | Feb. 10, 1920 |
| 1,992,990 | Burns | Mar. 5, 1935 |
| 2,051,284 | Ball | Aug. 18, 1936 |
| 2,179,693 | Goldstein | Nov. 14, 1939 |